(12) United States Patent
Anderson

(10) Patent No.: US 6,907,818 B2
(45) Date of Patent: Jun. 21, 2005

(54) SYSTEM AND METHOD FOR PROVIDING DRY FILTERED AIR TO A BRAKE ACTUATOR

(75) Inventor: Maurice Anderson, Lawson, MO (US)

(73) Assignee: Haldex Brake Corporation, Kansas City, MO (US)

( * ) Notice: Subject to any disclaimer, the term of this patent is extended or adjusted under 35 U.S.C. 154(b) by 37 days.

(21) Appl. No.: 10/695,965

(22) Filed: Oct. 29, 2003

(65) Prior Publication Data
US 2005/0092172 A1   May 5, 2005

(51) Int. Cl.⁷ .............................................. F15B 21/02
(52) U.S. Cl. ............................................ 92/62; 92/82
(58) Field of Search .................... 60/48, 62, 63, 60/64, 82; 91/172, 518

(56) References Cited

U.S. PATENT DOCUMENTS

| | | |
|---|---|---|
| 3,710,692 A * | 1/1973 | Valentine ........................ 92/63 |
| 3,736,842 A | 6/1973 | Valentine |
| 3,800,668 A | 4/1974 | Valentine |
| 4,889,037 A | 12/1989 | Goral et al. |
| 4,890,540 A | 1/1990 | Mullins |
| 5,372,059 A * | 12/1994 | Pierce et al. .................... 92/48 |
| 5,584,538 A | 12/1996 | Takasaki |
| 5,937,733 A | 8/1999 | Stojic |
| 6,006,651 A | 12/1999 | Pierce et al. |
| 6,264,291 B1 | 7/2001 | Eberling et al. |
| 6,588,314 B1 * | 7/2003 | Stojic ............................ 92/82 |

* cited by examiner

Primary Examiner—Edward K. Look
Assistant Examiner—Michael Leslie
(74) Attorney, Agent, or Firm—St. Onge Steward Johnston & Reens LLC

(57) ABSTRACT

A spring brake actuator that utilizes a valve for providing compressed air to a spring cavity, the air having previously been dried and filtered so as to prevent contaminates and moisture from corroding and/or damaging the spring in the spring cavity, the valve being actuated by a difference in pressure from one side of the valve to the other.

26 Claims, 6 Drawing Sheets

SYSTEM AND METHOD FOR PROVIDING DRY FILTERED AIR TO A BRAKE ACTUATOR

FIELD OF THE INVENTION

The invention relates generally to a system and method of providing compressed air to a spring chamber, more specifically the invention relates to a pressure sensitive two-way internal valve that ventilates a spring cavity with compressed air that has previously been filtered and dried.

BACKGROUND OF THE INVENTION

Fluid-operated braking systems have long been utilized to control the movement of motor vehicles in a safe and effective manner. In particular, air brakes are commonly used on commercial vehicles such as trucks, which typically have large gross vehicle weights. The considerable inertial mass of these heavy-duty vehicles in combination with the high speeds at which they travel requires a braking system which responds rapidly with substantial braking power. One system component which is instrumental in the operation of air brake systems is the brake actuator, which provides the force necessary for braking a vehicle.

In a typical diaphragm spring brake actuator, the brakes may be applied in a number of ways. For normal braking operation, compressed air is introduced into the brake chamber, which coacts with a diaphragm, typically an elastomeric diaphragm, and a push rod to apply the brakes. For emergency and/or parking brake applications, a barrel-shaped power spring stores potential energy and exerts the large force required for braking in case of air pressure failure. During normal driving operation, air pressure compresses the power spring and maintains it in its brake release position. When the air is exhausted, the power spring expands coacting with the diaphragm and push rod and thereby applies the brakes in case of failure of the system air pressure or exhaustion of compressed air while the vehicle is not in operation or is parked.

The power spring is positioned in a spring chamber, which is typically formed by clamping an elastomeric diaphragm between a head (sometimes also known as a spring housing or spring chamber) and a flange case (sometimes known as an adaptor). The power spring is compressed within the spring chamber between the head and the diaphragm. The power spring has a high spring constant and is normally compressed to a height of less than 3 inches from an original uncompressed height of from 9 to 12 inches. The power spring, therefore, stores a substantial amount of potential energy, usually exerting a force on the head of about 2,000 to 3,000 pounds.

It is undesirable to unnecessarily expose the power spring to corrosive elements such as dirt and moisture, because due to the large forces involved, the power spring is subject to failure. As the power spring provides emergency breaking for the vehicle if the air system malfunctions, failure or breakage of the power spring because of for instance, corrosion, could be catastrophic resulting in a complete failure of the vehicle braking system.

Typically air drawn from the atmosphere to be utilized with air brake assemblies is passed through an air filter/drier after being compressed. This allows the air compressor to supply clean, dry air to the braking system. However, the vent air in the spring brake chamber itself is generally drawn directly from the atmosphere as compressed air is not utilized to supply vent air when one actuates the emergency or parking brake. This is undesirable as stated above because dirt and moisture may then be drawn into the spring brake chamber, which may corrode the power spring.

Various systems have sought to prevent the introduction of dirt and moisture into the spring cavity. For instance, U.S. Pat. Nos. 3,736,842 and 3,800,668 both to Valentine ("the '842 patent" and "the '668 patent") disclose a breathing system for spring brake actuators that allows the flow of air from within the actuator assembly to and from the spring cavity so that dirt and moisture present in the outside air is not delivered to the spring cavity. However, both the '842 patent and the '668 patent disclose a systems that utilize an O-ring seal for sealing between the control cavity and the service chamber. As the brake assembly laterally reciprocates between the parking break engaged and disengaged positions, fluid communication is selectively made between the spring cavity and the control cavity or between the spring cavity and the service chamber. The lateral reciprocation of the brake assembly will cause wear to the O-ring seal such that bleeding of pressurized air between the control cavity and service chamber results in unnecessary loss of compressed air in the system. This in turn will cause unnecessary cycling of the system to make up for the constant air losses.

Another disadvantage of the systems taught in both the '842 patent and the '668 patent is that the brake assembly oscillates once the internal breathing valve is displaced to the opened position. This too will cause unnecessary cycling of the system. Still another disadvantage of the systems taught in both the '842 patent and the '668 patent is that the housing for the spring cavity must be sized to withstand the large pressures introduced therein from the control cavity. In addition, the added pressure to the spring cavity increases the speed and likelihood that the spring brake will be applied immediately if system emergency/parking air is lost.

Another system that has attempted to deal with this problem is U.S. Pat. No. 4,890,540 to Mullins ("the '540 patent"). The '540 patent discloses a system having a plurality of breather holes provided in the housing section of the power spring. The breather holes are located in the upper hemisphere of the housing to minimize the amount of dust and dirt that enters the housing. This system however, does not prevent moisture from entering the housing section of the power spring and will also not prevent contaminates from entering. At best, the system will simply slow the amount of contaminates that enter the housing.

Still another system is disclosed in U.S. Pat. No. 6,006,651 to Pierce et al. ("the '651 patent"). The '651 patent provides a gas permeable filter element over opening in the housing so that air entering the service brake inner chamber from the atmosphere will be substantially free of contaminates. However, this system does not prevent the introduction of moisture into the housing section of the power spring. While the '651 patent claims that the filters will prevent the introduction of contaminates, these filters, being so close to the roadway, will constantly need to be changed as dirt is drawn into them resulting in a system that requires much more maintenance and therefore downtime for the vehicle.

Yet another system is disclosed in U.S. Pat. No. 4,889,037 to Goral et al. ("the '037 patent"). The '037 patent provides for fluid communication between the power spring chamber and breather chamber which in turn is vented to atmosphere. This connection is provided so that solids and fluid that enter the breather chamber will not cause problems within the power spring chamber. However, this system still vents the power spring chamber to atmosphere, simply making the path a little longer. Contaminates will build up in the breather chamber, but this will not eliminate build up of contaminates in the power spring chamber. In addition, this system will not prevent moisture from entering the power spring chamber.

In still another system is disclosed in U.S. Pat. No. 5,937,733 to Stojic ("the '733 patent"). The '733 patent, like the '651 patent provides a filter assembly that covers holes in the power spring chamber. The filter assembly is provided for filtering air drawn from atmosphere into the power spring chamber. This system suffers from the same problems as the '651 patent, namely it does not prevent moisture from entering and will require a large amount of maintenance to keep the filters clean and functional.

Therefore, what is desired is to provide a braking system that minimizes the amount of dirt and moisture that is introduced into the power spring chamber.

It is further desired to provide a braking system that provides dry, filtered air to the power spring chamber.

It is still further desired to provide a braking system that minimizes air losses.

It is yet further desired to provide a braking system that facilitates the fluid communication of air from the service side of the brake actuator to the power spring chamber.

It is still further desired to provide a braking system that reduces the stress on the power spring.

SUMMARY OF THE INVENTION

These and other objects of the invention are achieved by use of spring brake actuator utilizing an internal breathing valve (IBV) selectively coupling a service chamber to a spring brake chamber. Dry, filtered air is selectively introduced to the service chamber, which is selectively introduced into the spring brake chamber through the IBV based upon the differential pressure developed across the IBV.

In this manner, only dry, filtered air is introduced into the spring brake chamber, thus eliminating the danger of dirt and/or moisture corroding and damaging the power spring of the spring brake actuator.

The IBV is equipped with a head portion that coacts with the compressed air that is introduced into the service chamber to close the IBV, thereby cutting off fluid coupling between the service chamber and the power spring chamber, once a threshold pressure differential is reached. The IBV will then selectively open, thereby reestablishing fluid coupling between the service chamber and the power spring chamber, once the pressure differential drops below a threshold value.

In one advantageous embodiment of the present invention a spring brake actuator is provided comprising a service chamber, and a spring chamber divided into a control chamber and a spring cavity. The spring brake actuator further comprises a valve connecting the service chamber with the spring cavity, the valve operable between an open position, in which the service chamber and the spring cavity are fluidly coupled to each other, and a closed position, in which the service chamber and the spring cavity are fluidly isolated from each other, the valve is biased to the open position by a force and displaceable to the closed position when a difference in pressure (DP) between the service chamber and the spring cavity exceeds the force.

In another advantageous embodiment of the present invention a valve in a spring brake actuator is provided having a service chamber and a spring chamber, the spring chamber having a control cavity and a spring cavity. The valve comprises a passageway connecting the service chamber with the spring cavity, the passage way having an area $(A_2)$. The valve further comprises a valve body located in the passageway and displaceable between an open and a closed position sealing off fluid communication between the service chamber and the spring cavity when the valve body is in the closed position, the valve body having a valve head with an area $(A_1)$ that is larger than area $(A_2)$, the valve head coacting with a pressure in the service chamber to move the valve body to the closed position.

In still another advantageous embodiment of the present invention a method for operating a spring brake actuator for a vehicle from a parking brake engaged position to a parking brake disengaged position, the method introducing dried and filtered air to a spring cavity to prevent damage to a power spring contained therein is provided, comprising the steps of fluidly coupling a service chamber with the spring cavity through a valve that is biased open by a force and introducing compressed air to the service chamber to generate a difference in pressure (DP) between the service chamber and the spring cavity. The method further comprises the steps of closing the valve once the difference in pressure (DP) exceeds the force and introducing compressed air into a control chamber that is fluidly isolated from both the service chamber and the spring cavity to compress the spring cavity. The method still further comprises the steps of releasing the compressed air from the service chamber, opening the valve once the force exceeds the difference in pressure (DP), and releasing compressed air in the spring cavity through the valve.

In yet another advantageous embodiment of the present invention a method for operating a spring brake actuator for a vehicle from a parking brake disengaged position to a parking brake engaged position, the method introducing dried and filtered air to a spring cavity to prevent damage to a power spring contained therein is provided, comprising the steps of fluidly coupling a service chamber with the spring cavity through a valve that is biased open by a force and introducing compressed air to the service chamber to generate a difference in pressure (DP) between the service chamber and the spring cavity. The method further comprises the steps of closing the valve once the difference in pressure (DP) exceeds the force and exhausting compressed air from a control chamber that is fluidly isolated from both the service chamber and the spring cavity to expand the spring cavity. The method still further comprises the steps of releasing the compressed air from the service chamber, opening the valve once the force exceeds the difference in pressure (DP), and drawing air into the spring cavity to equalize the difference in pressure (DP) developed across the valve due to the expansion of the spring cavity.

In still another advantageous embodiment of the present invention a valve connecting a service chamber with a spring cavity of a spring brake actuator through a passageway having an area $(A_2)$. The valve comprises a valve body located in the passageway and displaceable between an open and a closed position sealing off fluid communication between the service chamber and the spring cavity when the valve body is in the closed position, the valve body having a valve head with an area $(A_1)$ that is larger than area $(A_2)$, the valve is biased to the open position by a force (F) and displaceable to the closed position when a difference in pressure (DP) between the service chamber and the spring cavity exceeds the force (F).

The invention and its particular features and advantages will become more apparent from the following detailed description considered with reference to the accompanying drawings.

DETAILED DESCRIPTION OF THE DRAWINGS

Figure 1:
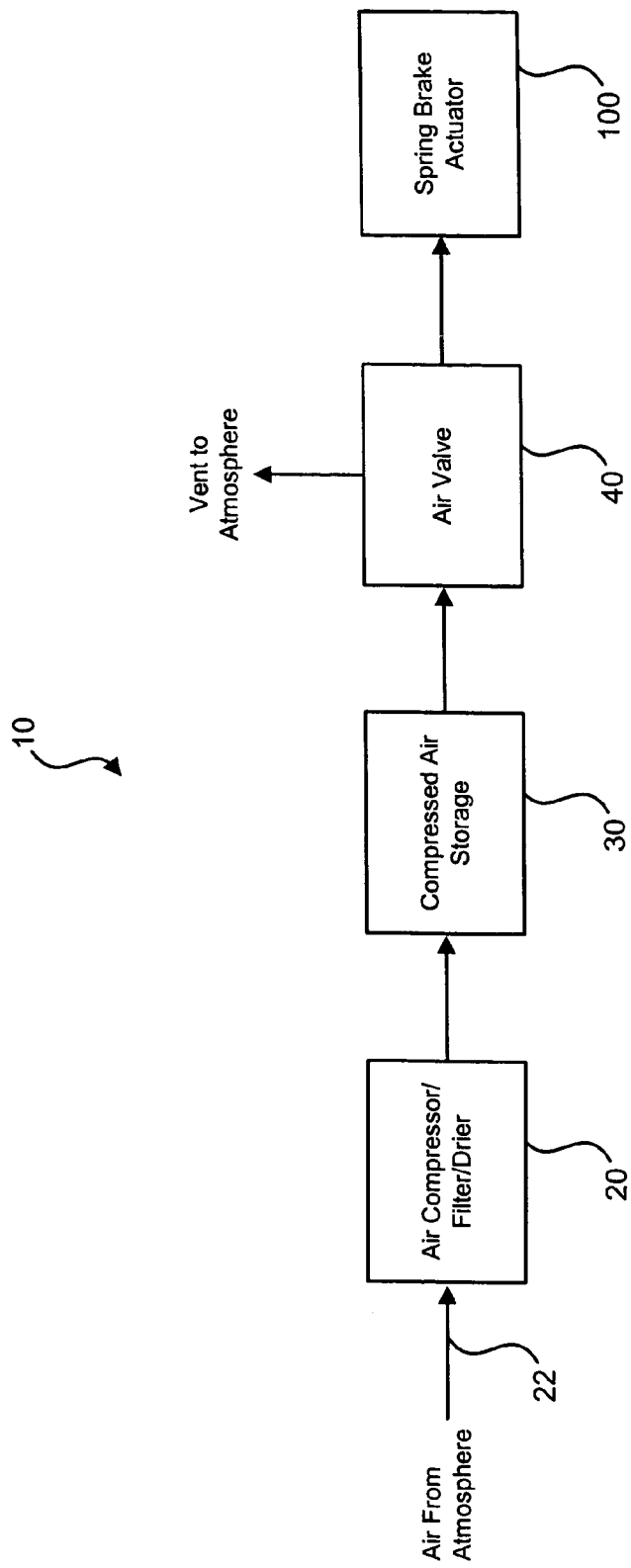
FIG. 1 is a block diagram illustrating the spring brake actuation system.

FIG. 1 is a block diagram of braking system 10 including air compressor/filter/drier 20, compressed air storage 30, air valve 40 and spring brake actuator 100.

Air compressor/filter/drier 20 is provided with an air inlet port 22 for drawing in air from the atmosphere. Air drawn from the atmosphere is filtered to remove any contaminates that may be located therein and dried to remove any moisture from the air. Air compressor/filter/drier 20 may comprise any suitable compressor and filter as is commonly utilized in the art to dry and filter the air drawn from the atmosphere.

Air compressor/filter/drier 20 is fluidly coupled to compressed air storage 30, typically through a check valve (not shown). Once filtered and dried, the air is transported to compressed air storage 30. Compressed air storage 30 may comprise any suitable storage medium, typically an air tank, for holding the filtered and dried air until needed by braking system 10.

Compressed air storage 30 is fluidly coupled to air valve 40, which is further fluidly coupled to spring brake actuator 100. Air valve 40 may be selectively actuated to provide compressed air from compressed air storage 30 to spring brake actuator 100 as desired. Air valve 40 may also be selectively actuated, as a quick release valve, to exhaust air from spring brake actuator 100 to atmosphere. Air valve 40 may be actuated by a number in inputs (not shown) including: actuation of a brake pedal (not shown) by a user; or actuation of a parking brake control (not shown). Although only one connection is shown from air valve 40 to spring brake actuator 100, a number of differing connections may be made to supply compressed air to differing chambers of spring brake actuator 100 depending upon the actuation input. For instance, actuation of a brake pedal (not shown) by an operator could cause air valve 40 to introduce compressed air to spring brake actuator 100 to apply the vehicle brakes (not shown). Alternatively, actuation of a dashboard parking brake control (not shown) may cause compressed air to be introduced to or exhausted from spring brake actuator 100 to either engage or disengage the vehicle parking brakes respectively.

Figure 2:
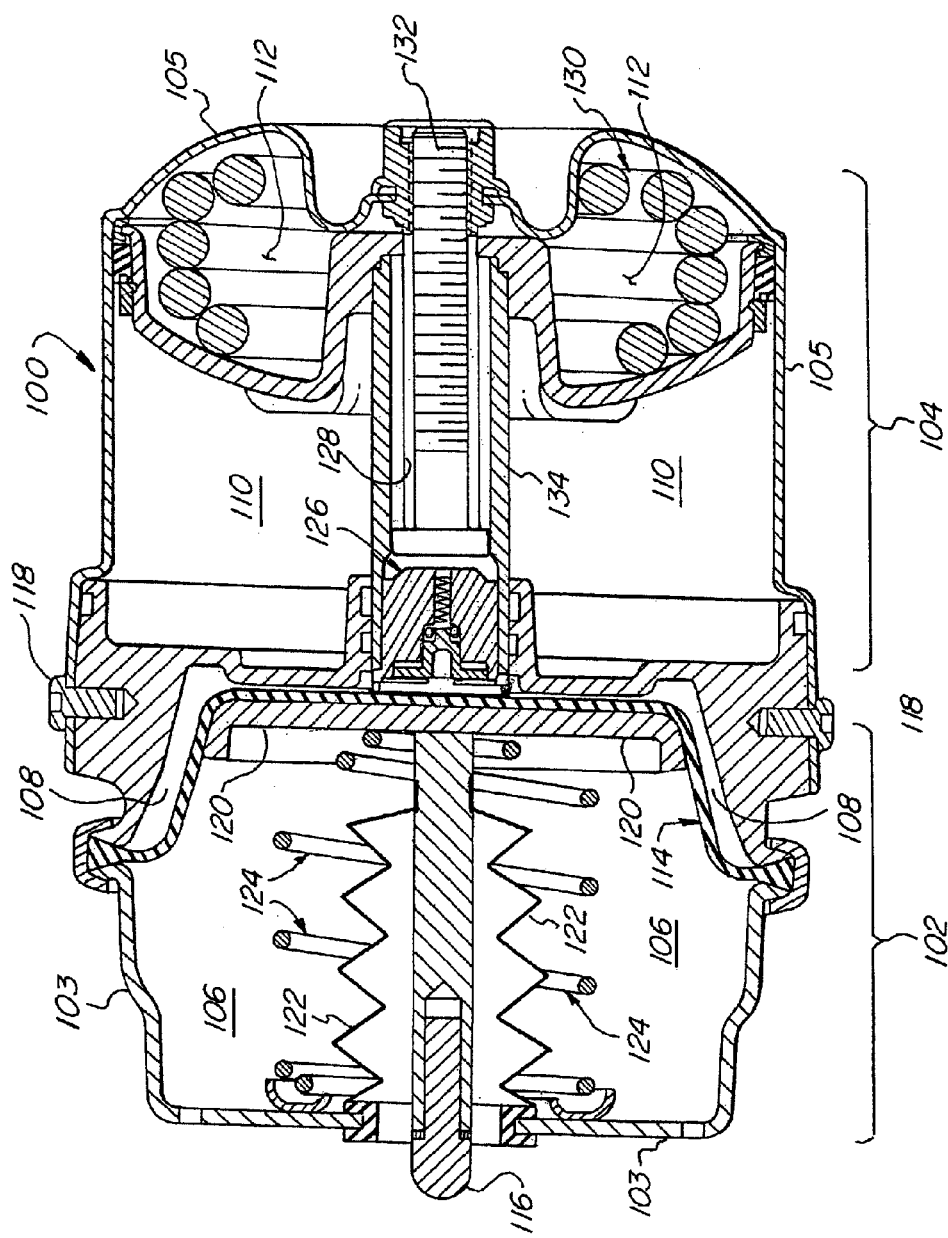
FIG. 2 is an illustration of a brake assembly according to one advantageous embodiment of the present invention incorporating the IBV, the brake assembly being shown with: the power spring contracted, the push rod fully retracted, and the IBV open.

FIG. 2 is an illustration of spring brake assembly 100 shown in the emergency brake disengaged position (i.e. vehicle driving position). Spring brake assembly is generally divided into the service chamber 102 and the spring chamber 104. Service chamber 102 is partitioned by a diaphragm 114 into spring return cavity 106 and pressure cavity 108, while spring chamber 104 comprises control cavity 110 and spring cavity 112. Service chamber 102 is also partially defined by service chamber housing 103, while spring chamber is partially defined by spring chamber housing 105.

Figure 3:
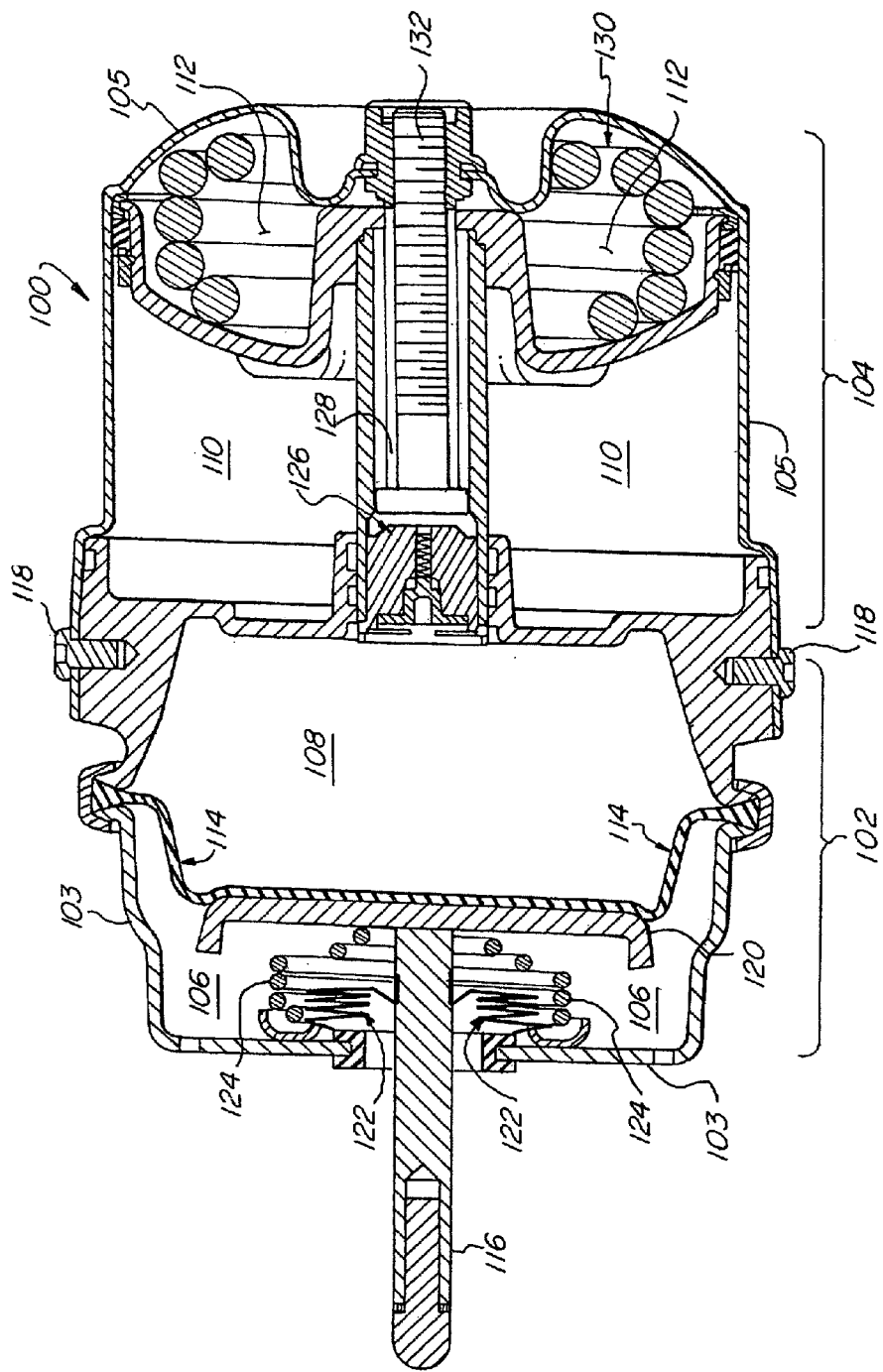
FIG. 3 is an illustration of the brake assembly according to FIG. 1, the brake assembly being shown with: the power spring contracted, the push rod fully extended, and the IBV closed.
Figure 4:
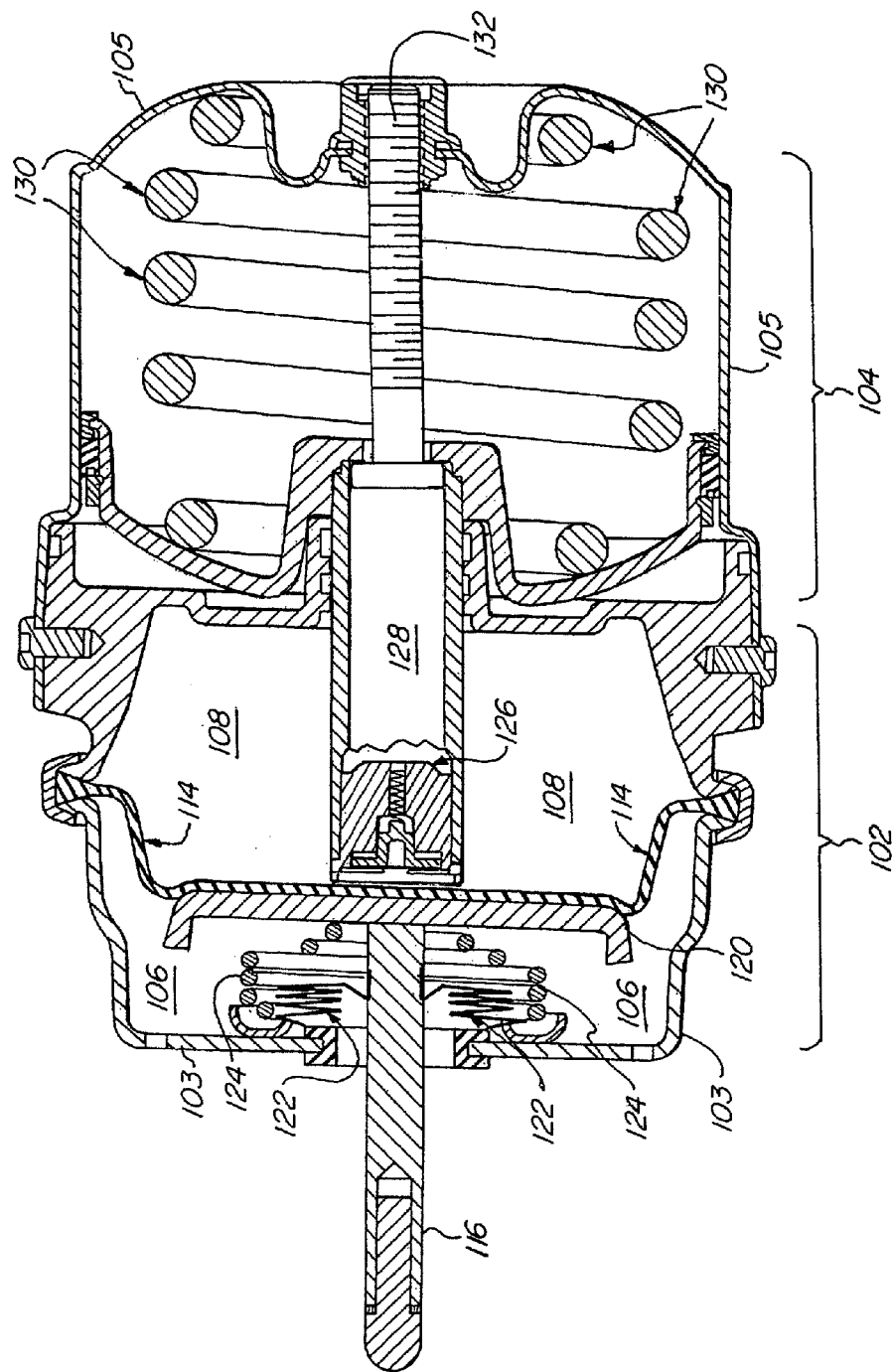
FIG. 4 is an illustration of the brake assembly according to FIG. 1, the brake assembly being shown with: the power spring fully extended, the push rod fully extended, and the IBV open.

Push rod 116, attached to push rod plate 120, laterally reciprocates depending upon whether there is air pressure in either pressure cavity 108 or control cavity 110. The lateral reciprocation of push rod 116 is variously illustrated in FIGS. 3 and 4, illustrating air pressure applied to pressure cavity 108 and air pressure exhausted from control cavity 110 respectively. Push rod 116 is part of a conventional brake assembly and engages with a cup (not shown) on an arm (not shown) for applying a braking mechanism (not shown).

Air ports 118 are also illustrated in FIG. 2, which are in fluid communication with pressure cavity 108 for selectively introducing compressed air into or exhausting air from pressure cavity 108. Compressed air will be introduced into pressure cavity 108 when, for instance, an operator depresses the brake pedal of a vehicle for normal braking operation (typically 45 psi is introduced into pressure cavity 108). As may be seen in FIG. 3, once compressed air is introduced into pressure cavity 108, the diaphragm 114 push rod plate 120, and push rod 116 are laterally displaced, thereby increasing the volume of pressure cavity 108 and decreasing the volume of spring return cavity 106. The air volume contained in return spring cavity 106 is exhausted to atmosphere, while bellows 122 and return spring 124 are compressed. This lateral displacement of push rod 116 will apply the vehicle braking system.

Once air pressure is exhausted from pressure cavity 108, i.e. when the vehicle operator removes pressure from the brake pedal, return spring 122 will laterally move push rod plate 120 and therefore push rod 116 back to a fully retracted position such that the brake system is not applied. As the volume in spring return cavity 106 is increases, air is drawn into spring return cavity 106 from atmosphere, however, this air volume is separated from the air volume in pressure cavity by diaphragm 114.

Also illustrated in FIGS. 2 and 3 is internal breathing valve 126. Internal breathing valve 126 selectively connects pressure cavity 108 with air cylinder 128 contained in piston 134, which in turn is fluidly coupled with spring cavity 112. Spring cavity 112 includes barrel spring 130, which is illustrated fully compressed in both FIGS. 2 and 3 due to the presence of compressed air in control cavity 110. Typically there will be about 100 psi in control cavity 110 to compress barrel spring 130 as illustrated in FIGS. 2 and 3. Control cavity 110 has an air port (not shown) for introducing and exhausting compressed air to and from control cavity 110. Typically, a dash mounted control means, such as a switch, is provided for applying or disengaging the parking brake by controlling the introduction and exhaustion of compressed air to and from control cavity 110.

Also illustrated in FIG. 2 is shaft 132, which is connected to one end of air cylinder 128. Shaft 132 is provided with threads such that, if maintenance is to be preformed on spring brake assembly 100, barrel spring 130 may be caged in the compressed position by the application of the nut threaded onto shaft 132 of piston 134. This is will allow maintenance personnel to disassemble spring brake assembly 100 in a conventional manner without being injured by for instance, the sudden expansion of barrel spring 100.

FIG. 4 is an illustration of spring brake assembly 100 when compressed air has been exhausted from control cavity 110. Once air pressure in control cavity 110 drops below the spring force of barrel spring 130, barrel spring 130 will expand increasing the volume of spring cavity 112 and decreasing the volume of control cavity 110. The effect is the same as discussed in connection with FIG. 3, namely, push rod 116 is laterally displaced such that the braking system is actuated. FIG. 4 illustrates spring brake assembly 100 when the vehicle is, for instance, not moving or parked.

As can be seen from FIGS. 2–4, compressed air may selectively be introduced into pressure cavity 108, through internal breathing valve 16, into air cylinder 128 and to spring cavity 112. As barrel spring 130 exerts a relatively large force, it is important to minimize and/or eliminate the introduction of contaminates and moisture to spring cavity 112, which may have the effect of corroding and/or damaging barrel spring 130. Therefore, air drawn from the atmosphere is filtered and dried prior to use in the system. In this manner, only dry, filtered air is introduced into spring cavity 112. It should also be noted that control cavity 110 is fluidly isolated from spring cavity 112.

Figure 5:
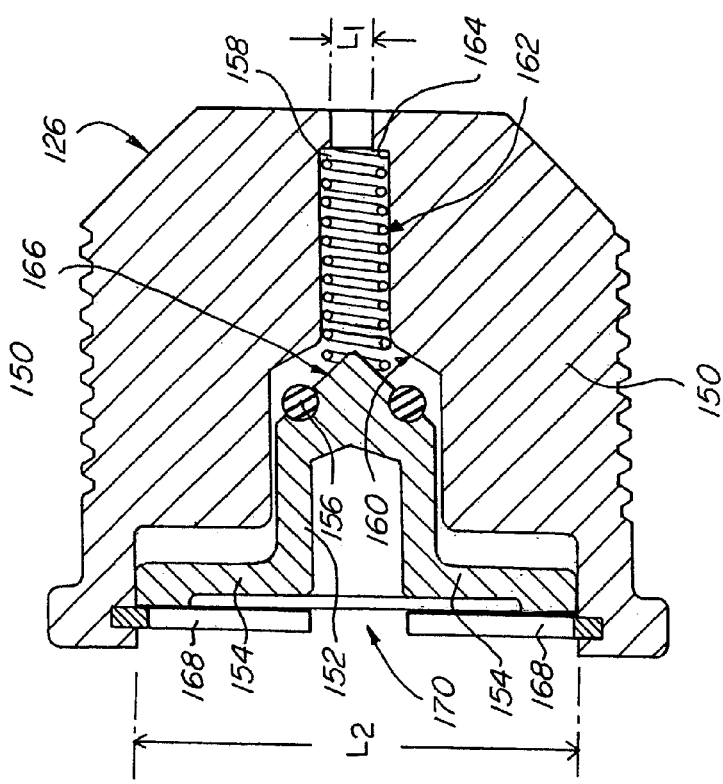
FIG. 5 is an illustration of the IBV according to FIG. 1, the IBV shown in the open position.
Figure 6:
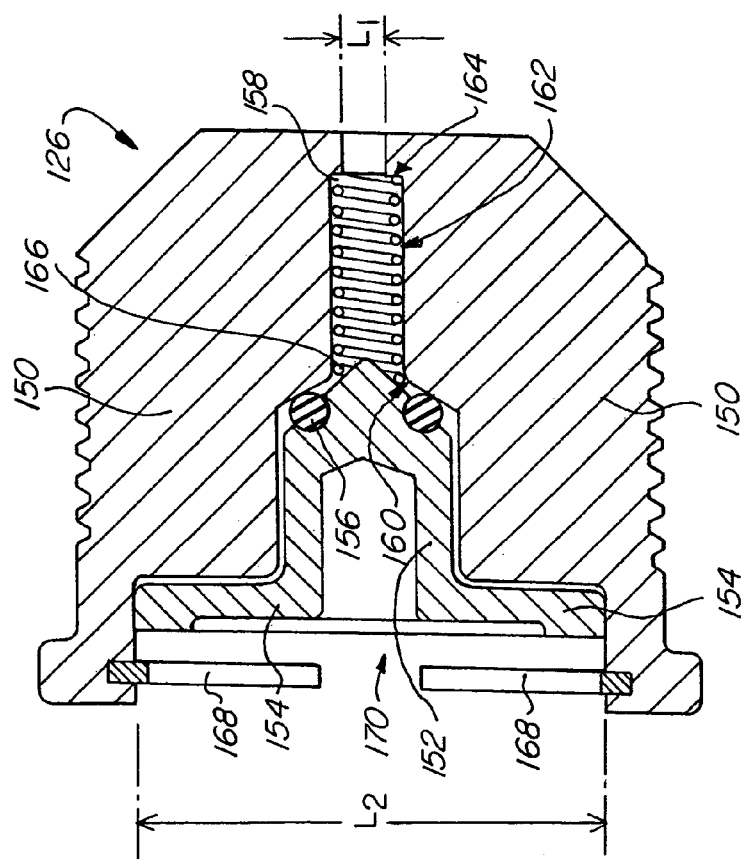
FIG. 6 is an illustration of the IBV according to FIG. 1, the IBV shown in the closed position.

FIGS. 5 and 6 variously illustrate a sectional view of internal breathing valve 126 in an open and a closed position respectively. Internal breathing valve 126 generally comprises a housing 150, a valve body 152, a valve head 154, and a passageway 158. As depicted in FIGS. 5 and 6, internal breathing valve 126 is provided as a poppet valve. Air pressure acting on the valve head 154, which is connected to valve body 152, will cause valve body 154 to be laterally displaced into passageway 158. Valve body 152 acts to seal off fluid communication from one side of internal breathing valve 126 to the other when in the closed position. To shut off fluid communication, valve body 152 is displaceable to seatingly engage with a ledge portion 160 provided in passageway 158.

Also provided in internal breathing valve 126 is bias spring 162, which biases valve body 152 to the open position. In one advantageous embodiment, bias spring 162 coacts with a step 164 provided at one end of passageway 158 so as to retain bias spring 162 in passageway 158. In another advantageous embodiment, a retaining portion 166 is provided at one end of valve body 152 for engaging with bias spring 162.

In one advantageous embodiment, bias spring 162 has a selected spring pressure (SP) exerting a force (F) to overcome approximately a 9 psi difference in pressure (DP). However, it is contemplated that bias spring 162 may be selected to overcome any selected difference in pressure (DP) as desired.

In one advantageous embodiment, valve body 152 is provided with a seal 156, which may comprise for instance, an O-ring attached to valve body 152. Seal 156 is designed to engage with ledge portion 160 to provide a seal from one side of internal breathing valve 126 to the other side. Seal 156 may comprise any suitable material that will provide an effective seal, such as for instance, a rubber or flexible plastic material.

Valve head 154 is attached to one end of valve body 152 and is provided to coact with an air pressure developed in pressure cavity 108. Actuation of valve body 152 of internal breathing valve 126 is dependant on a number of factors including: (DP); the ratio of, the area ($A_2$) of head portion 154 to the area ($A_1$) of passageway 158; and (SP).

In one advantageous embodiment, valve head 154 has an area ($A_2$) and the passageway 158 has an area ($A_1$) where ($A_2$)=10($A_1$). In this manner, when approximately 1 psi difference in pressure (DP) occurs across internal breathing valve 126, valve body 152 will move to the closed position. Approximately 1 psi difference in pressure will close valve body 152 because the 10:1 ratio ($A_2$)=10($A_1$) of valve head body 154 to passageway 158 will result in: (1 psi×10) which is approximately 10 psi. 10 psi is greater than the selected spring pressure (SP) of bias spring 162. In practice, when compressed air is introduced into pressure cavity 108 because of, for instance application of the brake pedal, the air pressure seen by valve head 154 will increase to approximately 45 psi resulting in the rapid closing of internal breathing valve 126. In one advantageous embodiment area ($A_2$) is approximately equal to the square root of 10 or 3.16.

In another advantageous embodiment, pressure in the service chamber 108 is ($P_{108}$) and pressure in spring cavity 112 is ($P_{112}$). The internal breathing valve will close when the following condition is true: $[(P_{108}) \times (A_2)] - (SP) > (P_{112}) \times (A_1)$. The internal breathing valve will open when the following condition is true: $(SP) - [(P_{108}) \times (A_2)] > (P_{112}) \times (A_1)$.

Although in this particular embodiment the ratio of 10:1 has been selected, it is contemplated that any ratio may be selected, such as 2:1, 5:1, 10:1 or any other ratio according to the desired sensitivity.

Also illustrated in FIGS. 5 and 6 in connection with internal breathing valve 126 is plate 168, which retains valve body 152 in passageway 158. An opening 170 is provided in plate 168 to allow fluid communication of valve head 154 with pressure cavity 108.

A sequence of operation will now be presented to further describe the inter-workings of the system.

Starting and initially driving vehicle. In the parked position, spring brake assembly 100 initially starts as illustrated in FIG. 4. Upon entering the vehicle, an operator engages the brake pedal, which pressurizes pressure cavity 108. This will quickly close internal breathing valve 126 because air pressure is acting on valve head 154. Air tries to enter air cylinder 128 but cannot because internal breathing valve closes at about a 1 psi difference in pressure. The operator then pushes the dash valve to release the spring parking brake. This pressures control cavity 110 and causes barrel spring 130 to be compressed. This in turn causes a pressure to build in spring cavity 112, which immediately pressurizes air cylinder 128. However, the air pressure built in air cylinder 128 cannot pressure cavity 108 because internal breathing valve 126 is closed due to pressure in pressure cavity 108. Pressure (approximately 45 psi) is still in pressure cavity 108 (from the application of the brake pedal by the operator) such that internal breathing valve 126 will remain closed and pressure will build up in both air cylinder 128 and spring cavity 112 to approximately 13 psi when barrel spring 130 is fully compressed. Pressure in control cavity 110 will continue to build so as to overcome the force of barrel spring 130 and the additional 13 psi buildup on the backside of the piston. At this point, spring brake assembly 100 is in the position illustrated in FIG. 3.

Now that the operator has released the parking brake by pressurizing control cavity 110 to approximately 100 psi, the operator may release the brake pedal to release the pressure in pressure cavity 108. Pressure in pressure cavity 108 is quickly released through the service line (not shown) and out through a quick release valve (not shown). The pressure in pressure cavity 108 is now 0 psi and bias spring 162 operates to open internal breathing valve 126 to vent the 13 psi in both air cylinder 128 and spring cavity 112. At this point, spring brake assembly 100 is in the position illustrated in FIG. 2, the brakes are off and the vehicle may drive away.

Normal driving and brake application. Initially, pressure in pressure cavity 108 is 0 psi as illustrated in FIG. 2. Pressure in control cavity 110 is approximately 100 psi, and pressure in both air cylinder 128 and spring cavity 112 is 0 psi, with internal breathing valve 126 open.

Once a braking application is made by the operator, pressure in pressure cavity rapidly increases to 45 psi, the sudden rise causing internal breathing valve 126 to close. Theoretically, if the braking application is done slow enough, air will be able to go around head portion 154 and now the area ration is not 10:1, but rather approaches 1:1. However, the flow area around head portion 154 is sized to match the orifice flow area to maximize quick closure of internal breathing valve 126. As previously described, the pressure in pressure cavity 108 overcomes the force exerted by bias spring 162 to close internal breathing valve 126. At this point, spring brake assembly 100 is in the position illustrated in FIG. 3.

Return spring 124 will disengage the braking system once the operator stops applying the brake pedal. Pressure in pressure cavity 108 is vented as previously described and spring brake assembly 100 returns to the position illustrated in FIG. 2.

Applying the parking brake. As previously described in connection with "normal driving", initially pressure in pressure cavity 108 is 0 psi as illustrated in FIG. 2. Pressure in control cavity 110 is approximately 100 psi, and pressure in both air cylinder 128 and spring cavity 112 is 0 psi, with internal breathing valve 126 open.

The operator then makes a braking application as described in connection with "normal driving" such that pressure in pressure cavity rapidly increases to 45 psi, the sudden rise causing internal breathing valve 126 to close and the brake is held by the operator. Spring brake assembly 100 is now in the position as described FIG. 3.

The vehicle is stopped and the operator pulls dash valve (not shown) to apply the parking brake and thus pressure in control cavity 110 drops from approximately 100 psi to 0 psi. While control cavity 110 is dropping to 0 psi, barrel spring 130 is able to overcome the dropping pressure to move piston 134 and apply the parking brake as illustrated in FIG. 4.

Pressure in pressure cavity 108 is still at approximately 45 psi ensuring that internal breathing valve 126 remains closed. With internal breathing valve 126 closed and piston 134 laterally reciprocating, a vacuum is generated in both air cylinder 128 and spring cavity 112 of approximately −9 psi.

With the vehicle stopped and the parking brake applied the operator then releases the brake pedal, thereby exhausting the pressure in pressure cavity 108, which falls from approximately 45 psi to 0 psi. Both air cylinder 128 and spring cavity 112 are now at a −9 psi vacuum, however, since pressure cavity 108 has reached 0 psi, bias spring 162 will overcome the −9 psi vacuum and internal breathing valve 126 will open. The opening of internal breathing valve 126 facilitates the venting of the vacuum in both air cylinder 128 and spring cavity 112 to the service line (not shown), which is ultimately open to atmospheric pressure via quick release valve (not shown). At this point, pressure cavity 108, air cylinder 128, control cavity 110 and spring cavity 112 are all at 0 psi.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A spring brake actuator comprising:
   a service chamber;
   a spring chamber divided into a control chamber and a spring cavity; and
   a valve connecting said service chamber with the spring cavity, said valve operable between an open position, in which said service chamber and the spring cavity are fluidly coupled to each other, and a closed position, said valve is biased to the open position by a force and displaceable to the closed position when a difference in pressure (DP) between said service chamber and the spring cavity exceeds the force.

2. The spring brake actuator according to claim 1 wherein the control chamber is fluidly isolated from both said service chamber and the spring cavity.

3. The spring brake actuator according to claim 1 wherein when the (DP) is at least 1 psi, the valve moves to the closed position.

4. A valve in a spring brake actuator having a service chamber and a spring chamber, the spring chamber having a control cavity and a spring cavity, the valve comprising:
   a passageway connecting the service chamber with the spring cavity, said passage way having an area ($A_2$); and
   a valve body located in said passageway and displaceable between an open and a closed position sealing off fluid communication between the service chamber and the spring cavity when said valve body is in the closed position, said valve body having a valve head with an area ($A_1$) that is larger than area ($A_2$), the valve head coacting with a pressure in said service chamber to move said valve body to the closed position.

5. The valve according to claim 4 wherein said passageway further comprises a ledge portion and said valve body further comprises a seal coacting with the ledge portion to fluidly isolate the service chamber and the spring cavity from each other when said valve body is in the closed position.

6. The valve according to claim 5 wherein the seal comprises an O-ring.

7. The valve according to claim 5 wherein said valve body further comprises a retaining portion for securely holding the seal thereon.

8. The valve according to claim 4 wherein said valve body is biased to the open position by a force and displaceable to the closed position when a difference in pressure (DP) between said service chamber and the spring cavity exceeds the force.

9. The valve according to claim 8 further comprising a spring located in said passageway and engaged with said valve body, said spring providing the force to bias said valve body to the open position.

10. The valve according to claim 8 wherein when the difference in pressure (DP) is greater than a threshold value, said valve body moves to the closed position.

11. The valve according to claim 10 wherein when the difference in pressure (DP) is greater than 1 psi, said valve body moves to the closed position.

12. The valve according to claim 8 wherein when the difference in pressure (DP) is less than a threshold value, said valve body moves to the open position.

13. The valve according to claim 4 wherein an area ratio between said valve head and said valve body is greater than 2:1.

14. The valve according to claim 4 wherein an area ratio between said valve head and said valve body is greater than 5:1.

15. The valve according to claim 4 wherein an area ratio between said valve head and said valve body is approximately 10:1.

16. A method for operating a spring brake actuator for a vehicle from a parking brake engaged position to a parking brake disengaged position, the method introducing dried and filtered air to a spring cavity to prevent damage to a power spring contained therein, comprising the steps of:
fluidly coupling a service chamber with the spring cavity through a valve that is biased open by a force;
introducing compressed air to the service chamber to generate a difference in pressure (DP) between the service chamber and the spring cavity;
closing the valve once the difference in pressure (DP) exceeds the force;
introducing compressed air into a control chamber that is fluidly isolated from both the service chamber and the spring cavity to compress the spring cavity;
releasing the compressed air from the service chamber;
opening the valve once the force exceeds the difference in pressure (DP); and
releasing compressed air in the spring cavity through the valve.

17. The method according to claim 16 wherein when the difference in pressure (DP) is greater than 1 psi, the valve moves to the closed position.

18. A method for operating a spring brake actuator for a vehicle from a parking brake disengaged position to a parking brake engaged position, the method introducing dried and filtered air to a spring cavity to prevent damage to a power spring contained therein, comprising the steps of:
fluidly coupling a service chamber with the spring cavity through a valve that is biased open by a force;
introducing compressed air to the service chamber to generate a difference in pressure (DP) between the service chamber and the spring cavity;
closing the valve once the difference in pressure (DP) exceeds the force;
exhausting compressed air from a control chamber that is fluidly isolated from both the service chamber and the spring cavity to expand the spring cavity;
releasing the compressed air from the service chamber;
opening the valve once the force exceeds the difference in pressure (DP); and
drawing air into the spring cavity to equalize the difference in pressure (DP) developed across the valve due to the expansion of the spring cavity.

19. A valve connecting a service chamber with a spring cavity of a spring brake actuator through a passageway having an area ($A_2$), the valve comprising:
a valve body located in said passageway and displaceable between an open and a closed position sealing off fluid communication between the service chamber and the spring cavity when said valve body is in the closed position, said valve body having a valve head with an area ($A_1$) that is larger than area ($A_2$), said valve is biased to the open position by a force (F) and displaceable to the closed position when a difference in pressure (DP) between said service chamber and the spring cavity exceeds the force.

20. The valve according to claim 19 wherein said passageway further comprises a ledge portion and said valve body further comprises a seal coacting with the ledge portion to fluidly isolate the service chamber and the spring cavity from each other when said valve body is in the closed position.

21. The valve according to claim 19 further comprising a spring located in said passageway and engaged with said valve body, said spring providing the force (F) to bias said valve body to the open position.

22. The valve according to claim 19 wherein when the difference in pressure (DP) is greater than a threshold value, said valve body moves to the closed position.

23. The valve according to claim 22 wherein when the difference in pressure (DP) is greater than 1 psi, said valve body moves to the closed position.

24. The valve according to claim 19 wherein actuation of the valve is dependant on (DP), the ratio of area ($A_2$) to area ($A_1$), and force (F).

25. The internal breathing valve according to claim 19 wherein the valve will close when: [a pressure in the service chamber ($P_{108}$)]×($A_2$)−F>[a pressure in the spring cavity ($P_{112}$)]×($A_1$).

26. The internal breathing valve according to claim 19 wherein the valve will open when: F−[a pressure in the service chamber ($P_{108}$)]×($A_2$)>[a pressure in the spring cavity ($P_{112}$)]×($A_1$).

* * * * *

UNITED STATES PATENT AND TRADEMARK OFFICE
CERTIFICATE OF CORRECTION

PATENT NO. : 6,907,818 B2  Page 1 of 1
APPLICATION NO. : 10/695965
DATED : June 21, 2005
INVENTOR(S) : Maurice Anderson It is certified that error appears in the above-identified patent and that said Letters Patent is hereby corrected as shown below:

Col. 8, lines 19-20:
"$(SP)-[(P_{108}) \times (A_2)] > (P_{112}) \times (A_1)$" should read -- $(SP)-[(P_{108}) \times (A_2)] > -(P_{112}) \times (A_1)$ --.

Col. 12, lines 43-45, Claim 26.
"F-[a pressure in the service chamber $(P_{108})] \times (A_2) >$ [a pressure in the spring cavity $(P_{112})] \times (A_1)$" should read -- F-[a pressure in the service chamber $(P_{108})] \times (A_2) >$ -[a pressure in the spring cavity $(P_{112})] \times (A_1)$ --.

Signed and Sealed this

Twenty-sixth Day of February, 2008

JON W. DUDAS
*Director of the United States Patent and Trademark Office*